(12) United States Patent
Chen et al.

(10) Patent No.: US 10,848,508 B2
(45) Date of Patent: *Nov. 24, 2020

(54) METHOD AND SYSTEM FOR GENERATING SYNTHETIC FEATURE VECTORS FROM REAL, LABELLED FEATURE VECTORS IN ARTIFICIAL INTELLIGENCE TRAINING OF A BIG DATA MACHINE TO DEFEND

(71) Applicant: PATTERNEX, INC., San Jose, CA (US)

(72) Inventors: Victor Chen, San Jose, CA (US); Ignacio Arnaldo, San Jose, CA (US); Constantinos Bassias, San Jose, CA (US)

(*) Notice: Subject to any disclaimer, the term of this patent is extended or adjusted under 35 U.S.C. 154(b) by 193 days.

This patent is subject to a terminal disclaimer.

(21) Appl. No.: 15/985,644

(22) Filed: May 21, 2018

(65) Prior Publication Data
US 2019/0132343 A1 May 2, 2019

Related U.S. Application Data

(63) Continuation-in-part of application No. 15/821,231, filed on Nov. 22, 2017, now Pat. No. 10,367,841, and (Continued)

(51) Int. Cl.
*H04L 29/06* (2006.01)
*G06K 9/62* (2006.01)
(Continued)

(52) U.S. Cl.
CPC ........ *H04L 63/1425* (2013.01); *G06F 21/552* (2013.01); *G06K 9/6255* (2013.01); (Continued)

(58) Field of Classification Search
CPC .. H04L 63/1425; G06N 20/00; G06N 3/0454; G06N 3/0472; G06N 3/084; G06N 7/00;
(Continued)

(56) References Cited

U.S. PATENT DOCUMENTS 8,418,249 B1 4/2013 Nucci
8,463,721 B2 6/2013 Prokhorov
(Continued)

OTHER PUBLICATIONS

NPL Search (Google Scholar) (Year: 2020).*
(Continued)

*Primary Examiner* — Mahfuzur Rahman
*Assistant Examiner* — Richard W Cruz-Franqui
(74) *Attorney, Agent, or Firm* — Hulsey, P.C.

(57) ABSTRACT

Identifying and detecting threats to an enterprise system groups log lines from enterprise data sources and/or from incoming data traffic. The process applies artificial intelligence processing to the statistical outlier in the event of the statistical outliers comprises a sparsely labelled real data set, by receiving the sparsely labelled real data set for identifying malicious data and comprising real labelled feature vectors and generating a synthetic data set comprising a plurality of synthetic feature vectors derived from the real, labelled feature vectors. The process further identifies the sparsely labelled real data set as a local data set and the synthetic data set as a global set. The process further applies a transfer learning framework for mixing the global data set with the local data set for increasing the precision recall area under curve (PR AUC) for reducing false positive indications occurring in analysis of the threats to the enterprise.

18 Claims, 10 Drawing Sheets

Related U.S. Application Data a continuation-in-part of application No. 15/662,323, filed on Jul. 28, 2017, now Pat. No. 10,264,027, application No. 15/985,644, which is a continuation-in-part of application No. 15/612,388, filed on Jun. 2, 2017, now Pat. No. 10,044,762, application No. 15/985,644, which is a continuation-in-part of application No. 15/382,413, filed on Dec. 16, 2016, now Pat. No. 9,904,893, application No. 15/985,644, which is a continuation-in-part of application No. 15/258,797, filed on Sep. 7, 2016, now Pat. No. 9,661,025.

(51) Int. Cl.
| | |
|---|---|
| *G06N 7/00* | (2006.01) |
| *G06N 20/00* | (2019.01) |
| *G06F 21/55* | (2013.01) |
| *G06N 3/04* | (2006.01) |
| *G06N 3/08* | (2006.01) |

(52) U.S. Cl.
CPC ......... *G06K 9/6259* (2013.01); *G06N 3/0454* (2013.01); *G06N 3/0472* (2013.01); *G06N 3/084* (2013.01); *G06N 7/00* (2013.01); *G06N 20/00* (2019.01); *G06K 9/6247* (2013.01); *G06K 9/6262* (2013.01)

(58) Field of Classification Search
CPC ... G06F 21/552; G06K 9/6255; G06K 9/6259
See application file for complete search history.

(56) References Cited

U.S. PATENT DOCUMENTS

| | | | |
|---|---|---|---|
| 8,682,812 B1* | 3/2014 | Ranjan | H04L 63/1425 706/12 |
| 9,049,173 B2* | 6/2015 | Yin | H04L 63/1408 |
| 9,608,961 B2 | 3/2017 | Yin | |
| 9,661,025 B2 | 5/2017 | Bassias | |
| 9,705,904 B1 | 7/2017 | Davis | |
| 2008/0168135 A1 | 7/2008 | Redlich | |
| 2008/0229415 A1 | 9/2008 | Kapoor | |
| 2011/0320387 A1* | 12/2011 | He | G06N 20/00 706/12 |
| 2012/0137367 A1 | 5/2012 | Dupont | |
| 2013/0297767 A1* | 11/2013 | Kozine | G06F 11/3447 709/224 |
| 2013/0318584 A1 | 11/2013 | Narayanan | |
| 2014/0278435 A1 | 9/2014 | Ganong, III | |
| 2014/0379618 A1* | 12/2014 | Chen | G06F 16/93 706/12 |
| 2015/0113649 A1 | 4/2015 | Angelov | |
| 2015/0213389 A1* | 7/2015 | Modarresi | G06Q 10/06393 705/7.39 |
| 2015/0229662 A1 | 8/2015 | Hitt | |
| 2017/0104773 A1* | 4/2017 | Flacher | H04L 63/1458 |
| 2017/0169360 A1 | 6/2017 | Veeramachaneni | |
| 2017/0236073 A1* | 8/2017 | Borisyuk | G06N 20/00 706/12 |
| 2017/0272471 A1 | 9/2017 | Veeramachaneni | |
| 2017/0372220 A1* | 12/2017 | Krishnamurthy | G06N 7/005 |
| 2018/0101742 A1 | 4/2018 | Burge | |
| 2018/0103056 A1 | 4/2018 | Kohout | |
| 2018/0115568 A1 | 4/2018 | Du | |
| 2018/0159877 A1 | 6/2018 | Holzhauer | |
| 2018/0159879 A1 | 6/2018 | Mestha | |
| 2018/0167404 A1 | 6/2018 | Machlica | |
| 2018/0176243 A1* | 6/2018 | Arnaldo | G06N 3/0454 |

OTHER PUBLICATIONS

Arnaldo, Arun, Lam, and Bassias; Learning Representations for Log Data in Cybersecurity; 1 PatternEx Inc, San Jose, CA, USA and 2 Universidad Rey Juan Carlos, Madrid, Spain; http://dai.lids.mit.edu (Year:2017).

Sheather, SJ; A reliable data-based bandwidth selection method for kernel density estimation; Feb. 2003; 9 pages.

Sheather, Simon J.; Density Estimation; paper by Statistical Science, vol. 19, No. 4, Institute of Mathematical Statistics, 2004; pp. 588-597.

Kleiner et al.; The big Data Bootstrap; Proceedings of the 29th International Conference on Machine Learning, Edinburgh, Scotland, UK, 2012; 8 pages.

"Transfer Learning," Wikipedia, Mar. 13, 2013, at http://web.archive.org/web/20130315035603/http://en.wikipedia.org/wiki/Transfer_learning.

\* cited by examiner

METHOD AND SYSTEM FOR GENERATING SYNTHETIC FEATURE VECTORS FROM REAL, LABELLED FEATURE VECTORS IN ARTIFICIAL INTELLIGENCE TRAINING OF A BIG DATA MACHINE TO DEFEND

CROSS REFERENCE TO RELATED APPLICATIONS

This application claims benefit to the provisional application No. 62/542,440 filed Aug. 11, 2017 and is incorporated herein by reference. This application is a continuation in part to the following U.S. patent application Ser. No. 15/821,231, filed Nov. 22, 2017; Ser. No. 15/662,323, filed Jul. 28, 2017; Ser. No. 15/612,388, filed Jun. 2, 2017; and Ser. No. 15/382,413, filed Dec. 16, 2016. All of which are expressly incorporated herein by reference in their entirety.

FIELD OF THE INVENTION

The present disclosure relates generally to a security analyst driven and machine learning driven computer security system and method for detecting threats by creating statistical rules using statistical outliers for one or more enterprise or e-commerce systems, and, more particularly, to a method and system for generating synthetic feature vectors from real, labelled feature vectors in artificial intelligence training of a big data machine to defend.

BACKGROUND

Electronic information across networks is a crucial aspect of an enterprise or e-commerce system. However, such electronic information may expose these systems to security threats. Hackers are constantly changing their behavior by figuring out current rules and designing newer attacks that can sidestep detection.

In current technology, information security solutions generally fall into two categories: security analyst-driven and unsupervised machine learning-driven. Security analyst-driven solutions rely on rules determined by fraud and security experts, and exhibit high rates of undetected attacks. This solution also leads to delays between attack detection and implantation of preventative countermeasures. These delays are both costly and time-consuming for the enterprise or e-commerce systems.

Unsupervised machine learning-driven solutions can lead to detection of rare or anomalous patterns and may also lead to improved detection of new attacks. However, these solutions trigger increased numbers of false positive alarms and alerts. These false positives require increased rates of substantial investigative efforts before they are dismissed.

Existing enterprises or e-commerce systems lack labeled threat examples from previous attacks, undercutting the ability to use supervised learning models. Due to the constant changing of an attacker's behavior, these models become irrelevant.

As a result, many enterprise and e-commerce systems using existing technology remain exposed to security threats, and improved security systems are needed to provide real time identification of threats.

Another challenge imposed by existing technology is resultant from malicious activities being extremely rare. Attack cases represent a minor fraction of total events, generally <0.1%. The dearth of malicious activities results in extreme class imbalance when learning a supervised model, and increases the difficulty of the detection process. Not all malicious activities are systematically reported, either because their incident responses were inconclusive, or because they were not detected in the first place. This includes noise into the data, since unreported attacks will be considered legitimate activity. Attack vectors can take a wide variety of shapes. Even when malicious activities are reported, the users are not always aware of the specific vectors involved. Therefore, difficulty arises in developing robust defense strategies that are capable of detecting as many attacks as possible.

Importantly, there is a need for a method and system capable of detecting threats in real time, and collecting analysts' feedback to improve detection rates over time.

From such information gathering, there is a need for an active learning method that reduces the false positives for the detected threats.

There is, further, a need for a system that incorporates behavioral predictive analytics for network intrusion and internal threat detection.

Now, a method and system capable of addressing real-time security system threats may have application in a broad array of active learning and machine learning applications that are of value and benefit to the information system security professionals. Accordingly, the scope of the present disclosure extends beyond the collecting and detecting of threats.

One of the biggest challenges in applying active learning and machine learning to information security is the sparsity of labelled dataset. Getting labels from human analysts is an expensive task with low volume, which does not scale with the rate that data is being logged. This sparsity problem presents potential difficulties when modeling rare events. Heretofore, there have not been effective ways to address this problem.

BRIEF SUMMARY

The present disclosure details an end-to-end system that learns over time from feedback from a security analyst, hereafter referred as analyst. The system may include a big data processing system, an outlier detection system, a feedback mechanism, a continuous learning system and a supervised learning module. The big data processing system comprises a platform that may quantify the features of different entities and compute them from raw data. With high-volume, high-velocity data, this first component requires processing at a challenging scale.

An exemplary outlier detection system may learn a descriptive model of those features extracted from the data via unsupervised learning, using one or more of a joint probability density, matrix decomposition or replicator neural network outlier detection system. To achieve confidence and robustness when detecting rare and extreme events, the system may fuse multiple scores into a final score that indicates how far a certain entity's or event's probability is from the others.

The feedback mechanism and continuing learning system may incorporate an analyst's input through a user interface. The feedback mechanism and continuing learning system may present the top outlier events or entities and ask the analyst to provide input indicating if a specific combination of features is, or is not, malicious. This feedback may then feed into the supervised learning module. The number of outlier events examined and the feedback frequency (e.g. daily or weekly) are both decided by the analyst.

The supervised learning module may receive the analyst's feedback, learn a model that predicts whether a new incoming event is normal or malicious, and may continually refine the model as more feedback is gathered.

In some embodiments, the supervised learning module may have access to labeled features from the past, historical labels, even before the detection system is deployed. An additional parameter, d∈[0,28] may be introduced to represent the number of days for which the labeled examples are available. For each strategy, the total number of detected attacks, the recall, and the area under the area under the receiver operating characteristic curve (AUC) of the deployed classifier may be reported on a monthly basis.

While the present disclosure is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

In light of the present disclosure, here appears a method and system for training a big data machine to defend that properly addresses the seriousness of detecting threats in real time. Even more specifically, the present disclosure provides a method and system for generating synthetic feature vectors from real, labelled feature vectors for artificial intelligence training of a big data machine to defend.

The method and system provide for retrieving one or more log line parameters belonging to one or more log lines from one or more enterprise data sources and from incoming data traffic to the enterprise. The method and system may further provide for computing one or more features from the log lines which includes one or more statistical processes. The one or more features may be applied to an adaptive rules model. The adaptive rules model may comprise one or more identified threat labels.

Embodiments of the present disclosure may convert each outlier scores matrix to a top scores model. Some embodiments may further combine each top scores model using a probability model to create a single top scores vector. Some embodiments may output the single top scores vector and the adaptive rules model via a GUI. Other embodiments of the present disclosure may label the output of the single top scores vector and the adaptive rules model to create one or more labeled features matrix. By creating this labeled features matrix, a supervised learning module may be provided with this matrix to update the one or more identified threat labels.

Embodiments of the present disclosure further refines the adaptive rules model for identification of statistical outliers and prevents access via categorized threats by detecting new threats in real time and reducing the time elapsed between threat detection of the enterprise system.

The present disclosure addresses one of the biggest challenges in applying active learning and machine learning to information security is the sparsity of labelled dataset. To alleviate this, the present disclosure provides a mechanism that generates "synthetic" feature vectors from real, labelled feature vectors. The disclosed subject matter includes a transfer learning framework where the synthetic dataset plays the role of an external "global" dataset, and the labeled data set given by the user acts as the local dataset.

The present disclosure solves the problem of getting labels from human analysts being an expensive task with low volume. Using synthetic feature vectors from real, labelled feature vectors allows for scaling the dataset with the rate that data is being logged. The disclosed solution adequately addresses the sparsity problem when modeling rare events.

The present disclosure provides a generative model that, given a set of (feature) vectors, constructs a distribution that approximates these vectors. Then new vectors may be generated by sampling from the constructed distribution. Evaluation of the disclosed process may occur through transfer learning. For purposes of the present disclosure, the transfer learning framework—mixing global and local dataset—may be adapted to simulate the effect of mixing synthetic and real feature vectors.

Small datasets pose a tremendous challenge in machine learning due to the few available training examples compounded with the relative rarity of certain labels which can potentially impede the development of a representative hypothesis. For the present disclosure, "Rare Datasets" are ones with low samples/features ratio and a skewed label distribution. Since a generalized training model cannot be theoretically guaranteed, a method to leverage similar data is needed. The presently disclosed method and system utilize transfer learning for the label space, present theoretical verification of our method and demonstrate the effectiveness of our framework with several real-world experiments.

Technical advantages of the disclosed subject matter demonstrate that importing 4000 synthetic feature vectors improves PR AUC from 66 to 77% on production feature set. This approach is superior to using 100 global, real feature vectors, with PR AUC at 71% (with crosses in feature set). While the improvement with synthetic feature vectors is not cumulative with improvement from adding DGA score, it is comparable with data augmentation through noise.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all the possible embodiments and contexts of the invention in this disclosure. Upon reading this disclosure, many alternative embodiments of the present invention will be apparent to the persons of ordinary skill in the art.

Embodiments of the present invention may process both web logs, firewall logs, or a combination of the two. In a typical enterprise or e-commerce system, logs may be delivered in real, streaming time from widely distributed sources. Typically, but not exclusively, web log analysis may facilitate the detection of web attacks. Typically, but not exclusively, mining firewall logs may facilitate the prevention of data ex-filtration in the enterprise or e-commerce setups.

Figure 1:
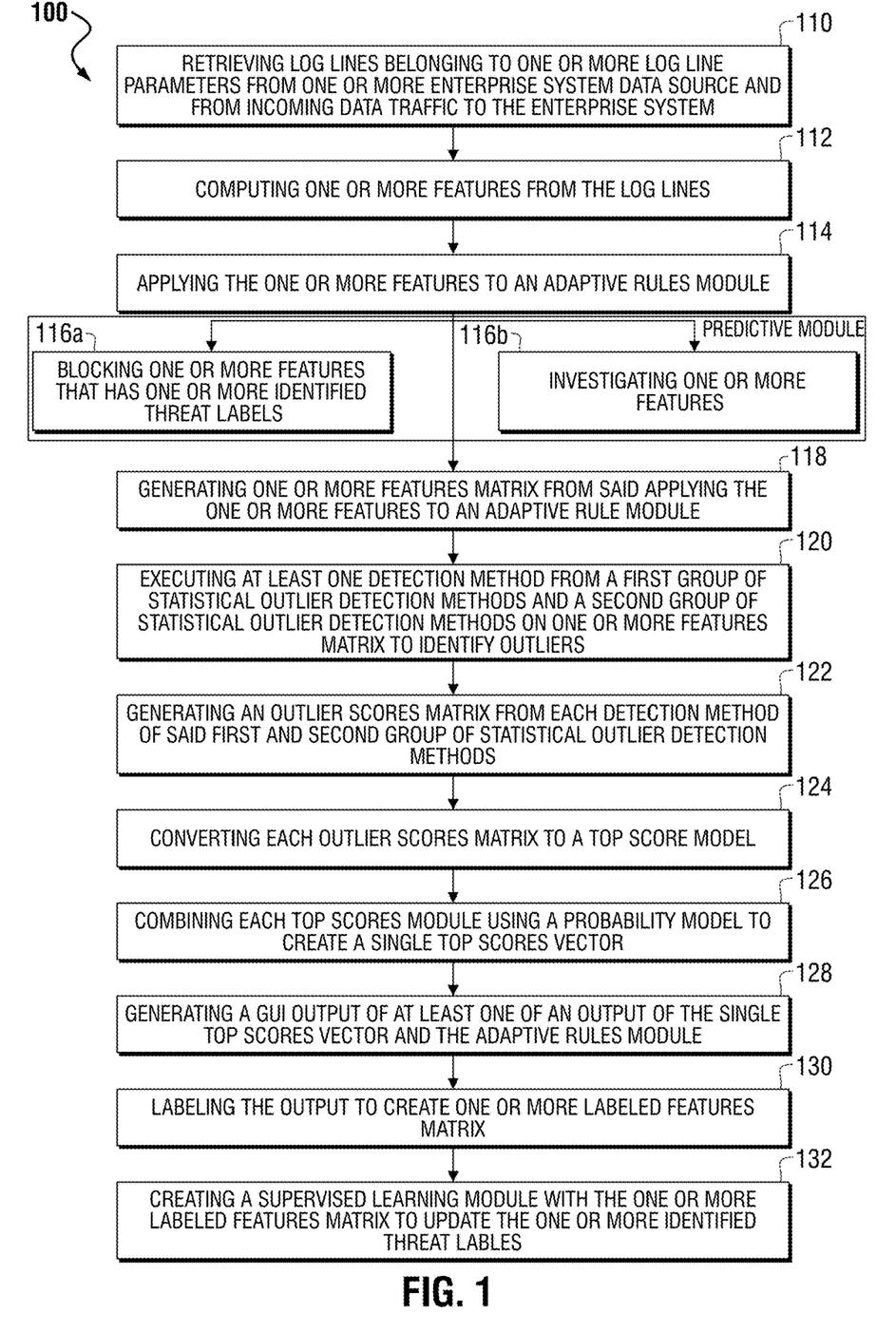
FIG. 1 depicts a general flow diagram illustrating a method for training a big data machine to defend, in accordance with some embodiments.
Figure 2:
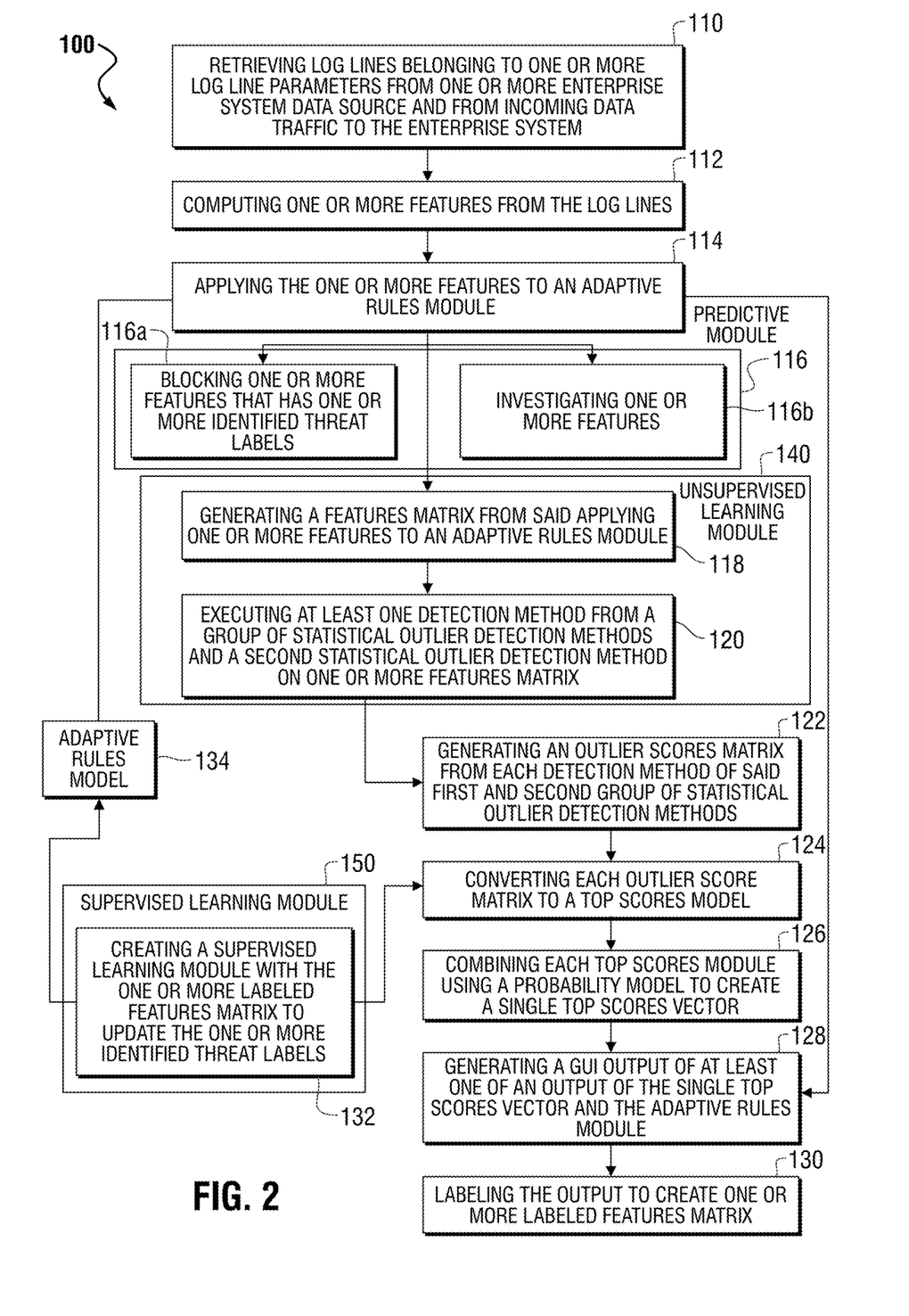
FIG. 2 depicts a flow diagram illustrating a method for training a big data machine to defend, outlining the supervised and unsupervised learning modules, in accordance with some embodiments.

FIG. 1 details a block diagram illustrating an exemplary method for training a big data system to defend an enterprise or e-commerce system, in accordance with some embodiments.

As shown, processing begins at 110, whereupon log lines belonging to one or more log line parameters from one or more enterprise or e-commerce system data source and/or from incoming data traffic to the enterprise or e-commerce system. The one or more enterprises or e-commerce system data sources comprises at least one of: web server access logs, firewall logs, packet captures per application, active directory logs, DNS logs, forward proxy logs, external threat feeds, AV logs, user logon audits, DLP logs, LB logs, IPS/IDS logs, black listed URLs, black listed IP addresses, and black listed referrers. The one or more log line parameters comprises at least one of: user ID, session, IP address, and URL query.

Process flow continues to 112, wherein one or more features are computed from the grouped log lines. Feature extraction may include activity tracking, activity aggregation, or a combination thereof. As disclosed herein, embodiments performing activity tracking may absorb log stream generated by the platform, identify the entities involved in each log line, e.g. IP address, user etc., and update the corresponding activity records. These activity records may then be calculated and stored according to system guidelines. In one guideline arrangement, activity records are calculated and stored in accordance with a short temporal window. For example, the temporal window over which these activity records may be computed and stored may be in one-minute increments. This way, the computation of behavioral features occurs for different time intervals: 30 minutes, 1 hour, 12 hours and 24 hours. This allows flexibility in analysis.

In a further guideline arrangement, activity records are calculated and stored for streamlined, efficient retrieval of the user data necessary for feature computation. Depending on the definition of the feature, aggregating activity records for a larger time window may include anything from simple counters to complex data structures.

In activity aggregation, computing behavioral features over an interval of time may require two steps, the first step being retrieving all activity records that fall within the given interval. The behavioral descriptors are aggregated over 24 hours and end at the time of the last user activity. This can be graphically represented as a given rolling time window for feature computation. The second step is to aggregate minute-by-minute activity records as the feature demands. Again, this aggregation step depends on the feature type. In the simplest step, counters, one must merely add all the minute-by-minute values together. The more complex case of unique values requires retrieving the unique values of a super set formed by the minute-to-minute sets.

Continuing the process flow, the one or more features may be applied to an adaptive rules model at block 114. At block 114, an embodiment may compare the one or more features to predetermined adaptive rules of malicious activities, non-malicious activities or any predetermined rule. A predictive module 116 may block one or more features that has one or more identified threat labels 116a, investigate one or more features 116b, or a combination thereof. Blocking one or more features may prevent a malicious activity by issuing a warning to the system, analyst, or a combination thereof. Investigating one or more features may involve an analyst investigating a labeled feature and determining if the label is correctly or incorrectly labeled, changing the label, or a combination thereof. At block 118 a features matrix may be generated from applying the one or more features to the adaptive rules model. In the features matrix, the one or more features make up the columns and the one or more log line parameters make up the rows. The features matrix, organized or grouped by sessions, comprises at least one of: user session duration, number of requests in user session, average time between clicks in user session, user session click rate, percentage of image requests in user session, percentage of 4xx responses in user session, percentage of 3xx responses in user session, percentage of 2xx responses in user session, percentage of zip responses in user session, percentage of binary responses in user session, and percentage of head requests in user session. The features of a features matrix, organized or grouped by URL queries, comprises at least one of: length of user URL query, number of characters of user URL query, number of digits of user URL query, and number of punctuations of URL query. The features of a features matrix, organized or grouped by user ID, comprises at least one of: number of checkouts, number of credit cards added, number of promo codes added, number of gift cards added, number of times items were shipped overnight, and number of times new shipping address was added. The features of a features matrix, organized or grouped by IP address, comprises at least one of: number of login failures, number of login successes, number of password resets, and total number of requests.

At block 120, process flow continues with performing at least one detection method from a first group of statistical outlier detection methods and performing at least a second detection method from a second group of statistical outlier detection methods on the one or more features matrix to identify statistical outliers. The first group of statistical outlier detection methods comprises at least one of: matrix decomposition-based outlier process, a replicator neural networks process, and a joint probability density process. The second group of statistical outlier detection methods comprises at least one of: matrix decomposition-based outlier process, a replicator neural networks process and a joint probability density process.

Figure 3:
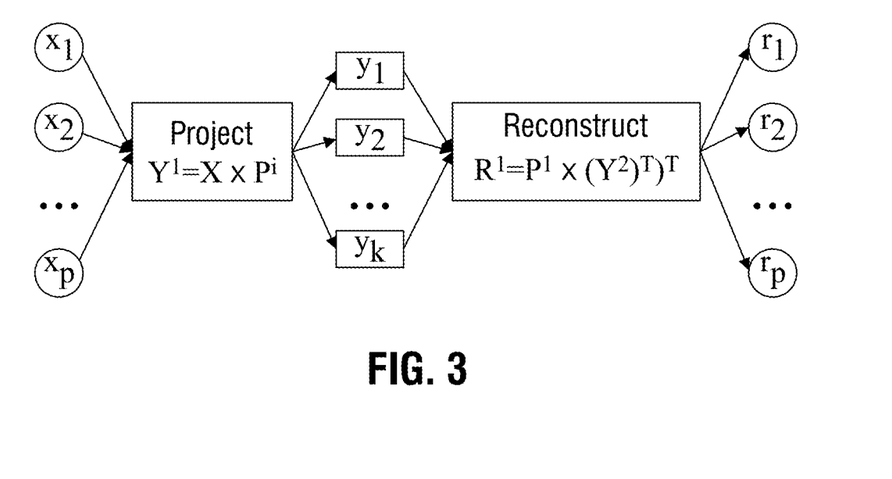
FIG. 3 shows a matrix decomposition outlier detection method, in accordance with some embodiments.

Shown in FIG. 3 is the matrix decomposition-based outlier process. Embodiments may employ the use of Principal Component Analysis to find cases that violate the correlation structure of the main bulk of data. To detect these rare cases, PCA-based methods may analyze the projection from original variables to the principal components' space, followed by the inverse projection or reconstruction from principal components to the original variable. When only the first principal components that explain most of the variance in data are used for projection and reconstruction, it is ensured that the reconstruction error will be low for the majority of the examples. This may be done while remaining high for outliers due to the first principal components explaining the variance of normal cases and the last principal components explaining the outlier variance.

Further defining the matrix decomposition-based outlier process, X is a p-dimensional dataset. Its covariance matrix $\Sigma$ can be decomposed as: $\Sigma = P \times D \times P^T$, where P is an orthonormal matrix where the columns are the eigenvectors of $\Sigma$, and D is the diagonal matrix containing the corresponding eigenvalues $\lambda_1 \ldots \lambda_p$. Graphically, an eigenvector can be seen as a line in 2D space, or a plane in higher dimensionally spaces, while its corresponding eigenvalue indicates how much the data is stretched in that direction. Note that, at this stage, some embodiments may sort the columns of the eigenvector matrix P and eigenvalue matrix D in order of decreasing eigenvalues. In other words, the eigenvectors and their corresponding eigenvalues are sorted in decreasing order of significance: the first eigenvector accounts for the most variance, the second for the second-most, etc. The projection of the dataset into the principal component space is given by Y=XP. This projection can be performed with a reduced number of principal components. Let $Y^j$ be the projected dataset using the top j principal components: $Y^j = X \times P^j$. In the same way, the reverse projection, from the principal component space to the original space, is given by $R^j = (P^j \times (Y^j)^T)^T$, where $R^j$ is the reconstructed dataset using the top j principal components. This process is schematically depicted in FIG. 3.

The present disclosure addresses one of the biggest challenges in applying active learning and machine learning to information security is the sparsity of labelled dataset. To alleviate this, the present disclosure provides a mechanism that generates "synthetic" feature vectors from user-labelled feature vectors. The disclosed subject matter includes a transfer learning framework where the synthetic dataset plays the role of the "global" dataset, and real dataset acts as the local dataset.

The present disclosure also solves the problem of getting labels from human analysts being an expensive task with low volume. Using synthetic feature vectors generated from real, labelled feature vectors allows for scaling the dataset with the rate that data is being logged. The disclosed solution adequately addresses the sparsity problem when modeling rare events.

The present disclosure provides a generative model that, given a set of (feature) vectors, constructs a distribution that approximates these vectors. Then new vectors may be generated by sampling from the constructed distribution.

For input, the present disclosure employs a labelled dataset that is generated from the same process as the transfer learning experiment. For illustrative purposes, labels here are generated between March 25 and April 13 where a label is considered negative if it is tagged as benign, and positive otherwise. The present subject matter focuses on the domain pipeline. The positive examples (almost all the labels) are the input to our generative model.

Two of the possible algorithms for generative models are generative adversarial networks (GANs) and variational autoencoders (VAE). These are two of the most popular and effective generative models based on neural networks. In computer vision, GANs tend to produce "nicer" images, whereas VAEs, with a clearly defined objective function, are easier to train and evaluate. Since the present domain does not involve images, the VAE is preferable.

At a high level, an autoencoder learns a compressed representation of the training data. A VAE differs from a standard autoencoder by imposing an additional constraint on the values of the compressed representation—that they must conform to a specified distribution. More concretely, a VAE has one initial hidden layer, followed by two layers that predict the mean and variance of the hidden layer distribution, then two decoding layers that map back to the original input. Once a VAE model is trained, generating new samples can be done by sampling from the Gaussian distribution with the trained mean and variance and then computing the flow through the decoding layers (in the actual implementation, samples are taken from the standard Gaussian for technical reasons).

Figure 4:
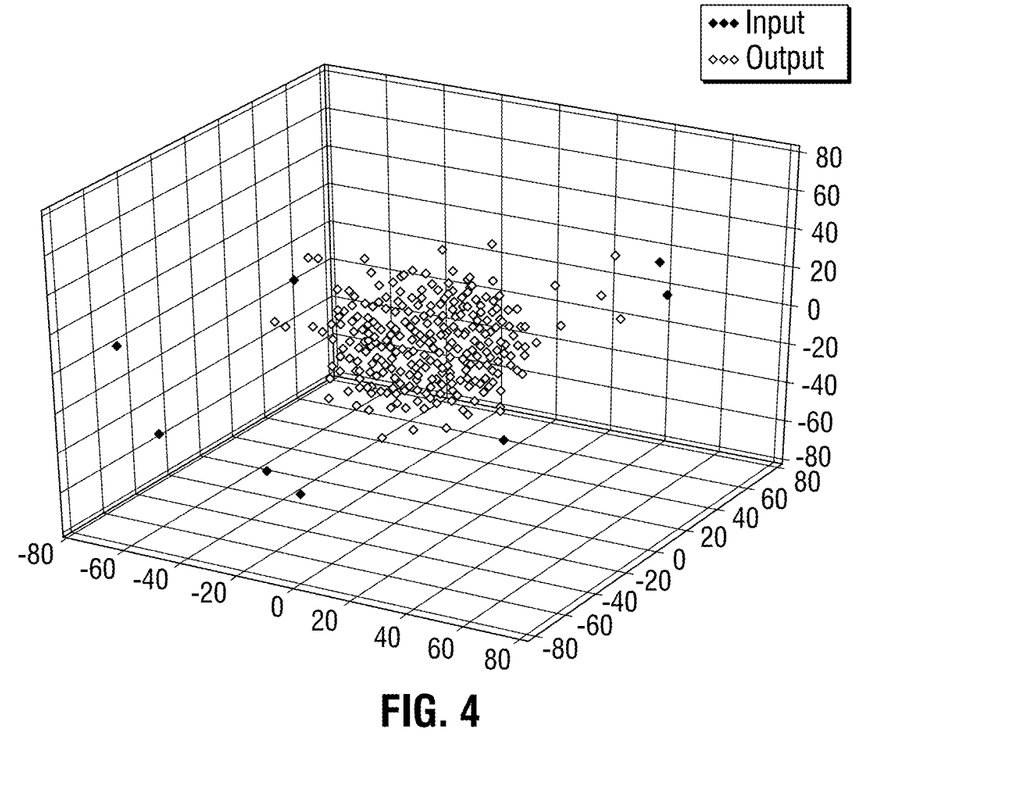
FIG. 4 a plot of both the input feature vectors and output feature vectors through t-SNE.
Figure 5A:
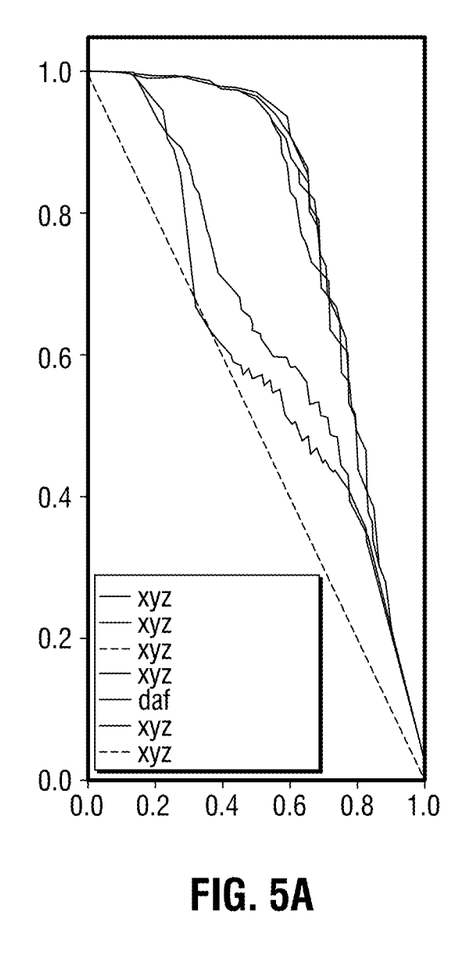
FIGS. 5A through 5D present options for setting the training set of the present disclosure.
Figure 5B:
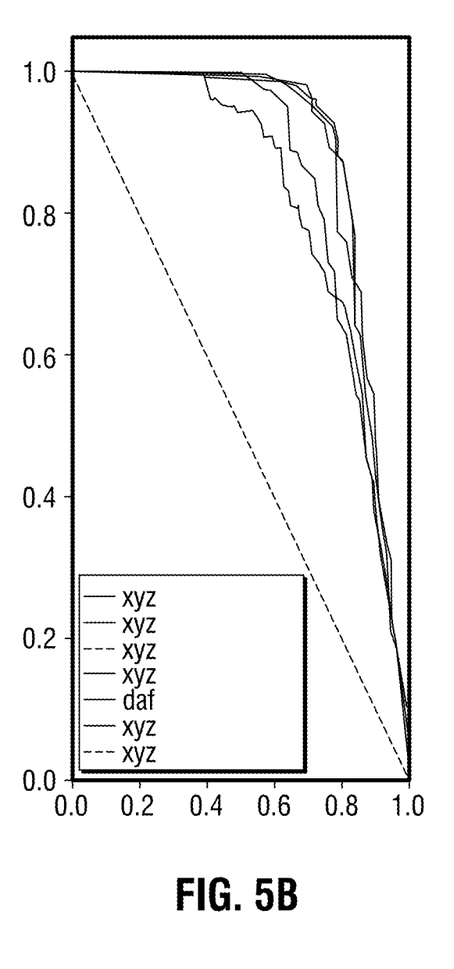
Figure 5C:
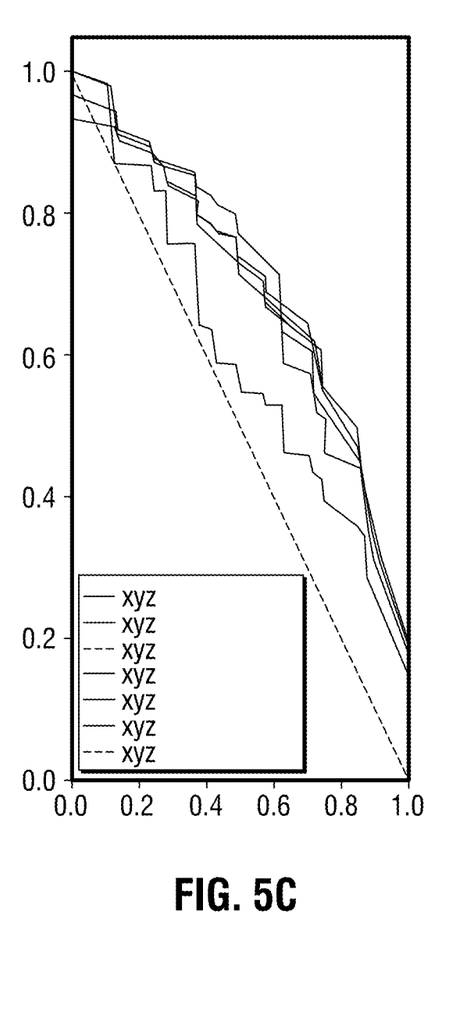
Figure 5D:
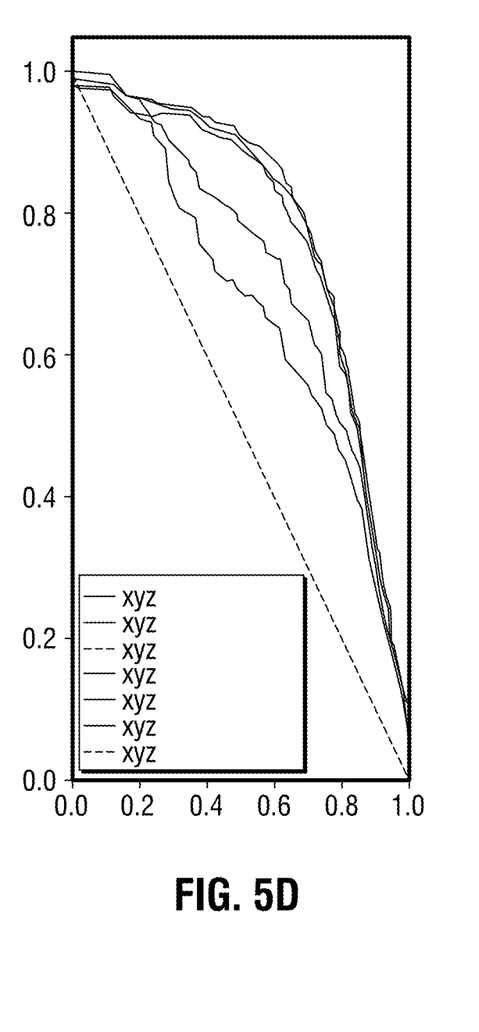

Visualization permits verification of the process. The present disclosure includes in FIG. 4 a plot of both the input feature vectors and output feature vectors through t-SNE. (Note that the feature vectors are projected to a three dimensional space. "Closeness" in original space implies closeness in three dimensional space, but the reverse implication is not always true.)

Evaluation of the disclosed process may occur through transfer learning. For purposes of the present disclosure, the transfer learning framework—mixing global and local dataset—may be adapted to simulate the effect of mixing synthetic and real feature vectors.

The present disclosure addresses an inherent bias in the analysis. The disclosed test set consists of examples that our old models ranked highly and were labelled by human analysts, and thus, an improvement means that a new model is better at finding previous attacks found by old models. There is no absolute guarantee that a new model is better at discovering future attacks. However, this bias is inherent in any offline analysis, not specific to the ideas explored in this experimental setup. Rather, the evaluation here should be treated as a guideline in the absence of online (A/B) testing, where we can evaluate experimental models on fresh, new dataset.

The characteristics of the present labelled dataset include the property that feature vectors are mostly positives, representing attacks. However, the presently disclosed process also requires that to train and evaluate, negative labels also are necessary. To obtain negative examples, the presently disclosed process makes the assumption that most traffic is normal. Accordingly, most of the unlabelled feature vectors are negative. So, the present disclosure randomly samples unlabelled feature vectors (i.e., those predicted as benign) within the same date range and join it with the existing positive examples. This approach ensures that the combined dataset has a positive ratio of about 0.01.

The presently disclosed subject matter further adopts a learning framework, as before, that uses 10 iterations of 3-fold cross validation. The evaluation set may be always a customer's local dataset. The disclosed process further studies the effect of synthetic feature vectors by varying the training dataset. The input to the generator model is the global dataset, standardized using a Standard Scaler process.

With an understanding of VAEs, an exemplary set of pseudocode for building a VAE model may include parameters of "orig_dim," representing the dimension of input feature vectors; "hidden_dim," representing dimension of first hidden layer in neural network; and "dist_dim," representing the dimension of second hidden layer in neural network.

Model serving using Input of (1) generator_model, (2) num_feature_vectors; and Output of a collection of synthetic feature vectors as follows:

```
synthetic_feature_vectors = [ ]
for i = 1, ..., num_feature_vectors:
    z_sample <- generate Gaussian vector of dimension
dist_dim Add the result of
generator_model.predict(z_sample) to
    synthetic_feature_vectors
    return synthetic_feature_vectors
```

(VAE) Model training: Input: data_matrix, a collection of feature vectors of dimension orig_dim. Output: a VAE model

```
Train a neural network with the following
architecture:
    1) input with dimension orig_dim, eps <-
random Gaussian vector of dimension dist_dim
    2) h <- dense layer with dimension hidden_dim
connected from input
    3) z_mean <- dense layer with dimension
dist_dim connected from h
    4) z_log_variance <- dense layer with
dimension dist_dim connected from h
    5) r <- z_mean + z_log_variance * eps, a
computational layer.
    6) decoder_h <- dense layer with dimension
hidden_dim connected from r
    7) output <- dense layer with dimension
orig_dim connected from decoder_h
M <- build a model with layers corresponding to
step 5 through 7) above. return M
```

Determining an optimal size of synthetic dataset involves an understanding of how the model performance is affected by the number of synthetic feature vectors. FIGS. 8A through 8D present the options of setting the training set, including "local," for which the training set consists of examples from the local customer only, and "fakeX," for which the training set consists of local examples and synthetic ones. Positive examples from other customers are used to train a VAE model. Then the disclosed process generates X*(size of positive examples from other customers) synthetic examples using the VAE model, where X represents a multiplicative factor.

FIGS. 5A through 5D reveal the PR curves for the average across all customers and demonstrate that the AUC improved from 66% to 71% by adding synthetic feature vectors to training set, with a multiplicative factor of 1, i.e., ~100 synthetic feature vectors. The AUC increases again from 71% to 77% by using 10× more synthetic dataset, whereas the improvement saturates after 10× and decreases after 40×. Since the purple curve is the "rightmost" one and has the highest AUC, in the rest of this analysis we will fix the multiplicative factor of synthetic dataset at 40×.

With the presently disclosed subject matter, there is an interplay between synthetic and global datasets. For the disclosed subject matter, the synthetic dataset is obtained from a distribution that approximates the global dataset. In assessing the process, it is possible to evaluate the effect when both synthetic and real global dataset are imported to a local customer's training data.

FIGS. 6A-6B and 7A-7B exhibit new curves wherein "global-pos" represents the training set consisting of local examples, and positive examples from other customers; "fake40+global-pos" represents the training set that consists of local examples, positive examples from other customers, and synthetic examples.

Figure 6A:
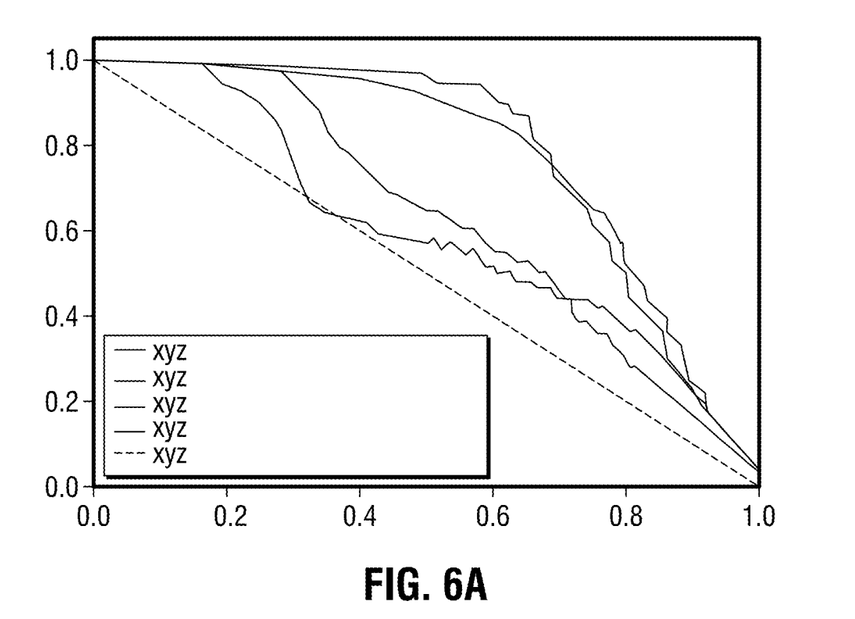
FIGS. 6A-6B and 7A-7B exhibit new curves representing the training set of the present disclosure.
Figure 6B:
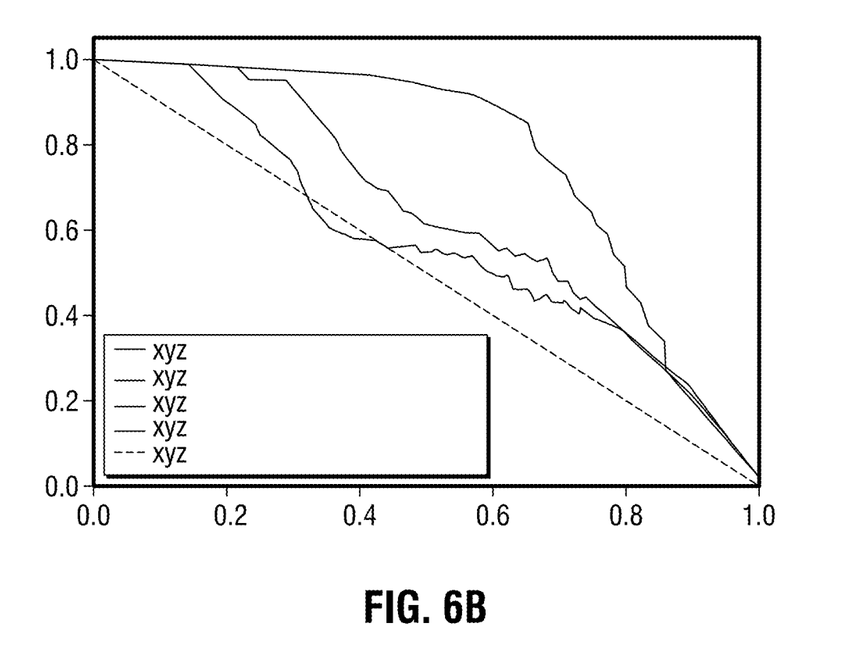
Figure 7A:
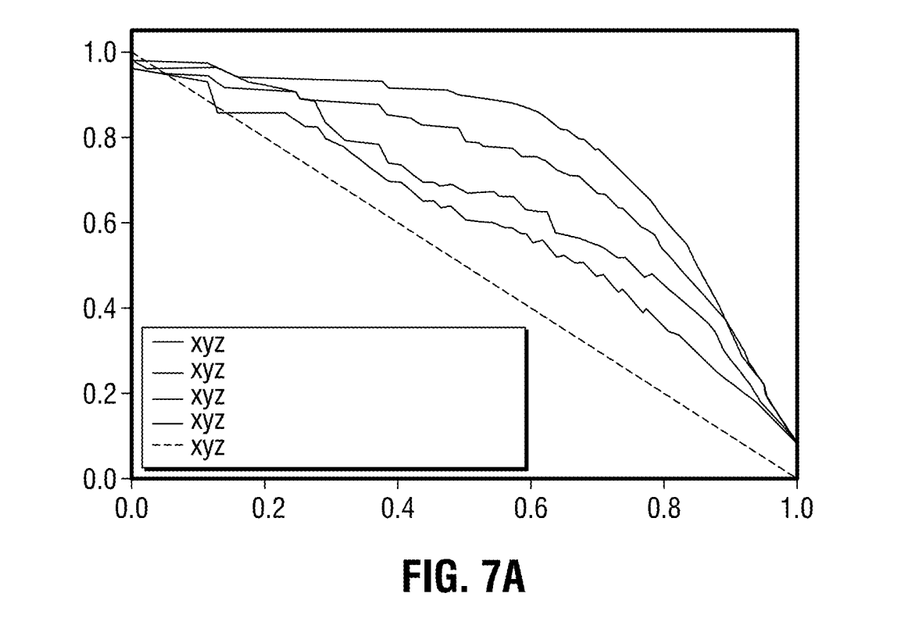
Figure 7B:
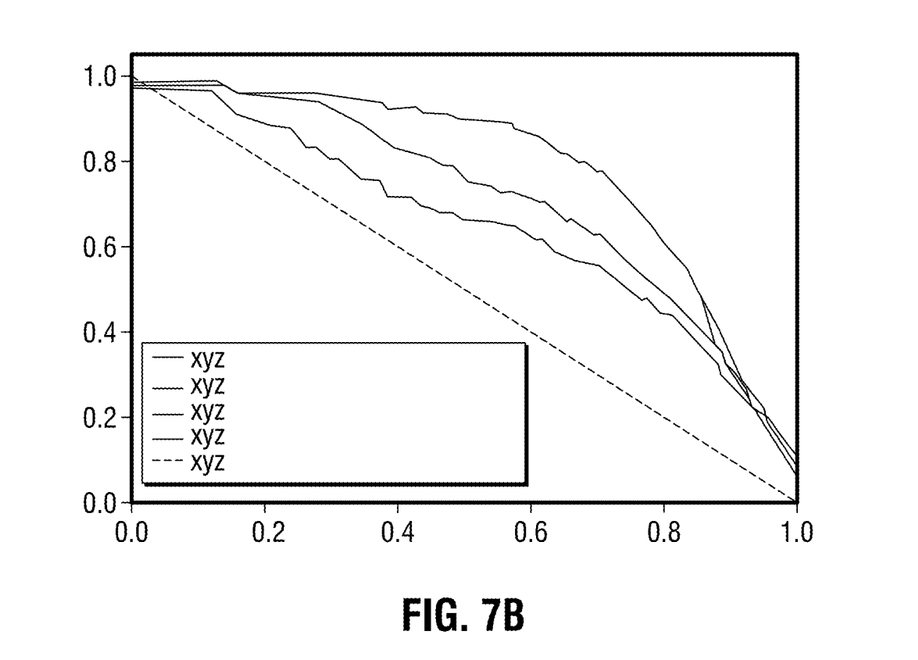

FIGS. 6A and 7A have the same feature set as before, but FIGS. 6B and 7B add the cross feature "customer_id" X "tot_threat_sessions." In FIGS. 6B and 7B, the synthetic effect seems to dominate over just having global dataset. The combined real and synthetic dataset is close to just using synthetic dataset. However, in FIGS. 6A and 7A, importing only the global dataset deteriorates model performance. Note, that this conclusion is consistent with the previous round of transfer learning analysis; importing global dataset deteriorates on the production feature set, but improves when crosses or DGA score are added.

The present disclosure accommodates a feature set interpretation in providing for generating synthetic feature vectors from real, labelled feature vectors artificial intelligence training of a big data machine to defend. In a production feature set, there are many features that are not active. Here, all entries in training data are either zero or NaN. When training a classifier. Such features are dropped (or have very low importance). Thus, at scoring, if a new example has a nonzero value in one of these features, the value plays no such role. For instance, if we design a new feature named Hammertoss (representing the probability that an attack conforms to a Hammertoss attack) and the training data has no Hammertoss attack patterns, then the classifier is generally ineffective in finding new Hammertoss attacks. Currently, the disclosed subject matter relies on using outlier models to circumvent this problem.

Adding a synthetic dataset has a beneficial effect in dealing with rarely-occurring features. Continuing with the above example, the feature Hammertoss will be close to zero but nonzero among the synthetic feature vectors. When mixed with real dataset, the new classifier will find a correlation between Hammertoss and positive labels, since only the synthetic examples have Hammertoss nonzero. However, this will also hold true for features such as count_pcap_available. As an illustration, here are the top features in training a random forest classifier using only local labels:

```
('sld_length', 12.177200000000001),
('tot_threat_sessions', 2.5939),
('count_web', 2.5628),
('count_allowed', 1.2881),
('sld_consonant_vowel_ratio', 0.9438),
('sld_consonant_ratio', 0.9423),
('sld_vowel_ratio', 0.8985000000000001),
('sld_digit_ratio', 0.6537)]
```

When using synthetic examples, the model is now tuned to find features such as count_pcap_available:

```
('num_phishing_names', 8.9439)
('count_pcap_available', 7.2406),
('count_blocked_url', 5.8378000000000005),
('count_malware', 2.8002000000000002)
('count_low', 1.5762),
('count_web', 1.377)].
```

In providing this desired functionality the disclosed subject matter presents an algorithm that takes in a string or an image, and produces a complex, multimodal distribution that we can sample from. The conditional variational autoencoder (CVAE) modifies the math in the previous section by simply conditioning the entire generative process on an input. CVAEs allow us to tackle problems where the input-to-output mapping is one-to many, without requiring us to explicitly specify the structure of the output distribution.

Figure 8A:
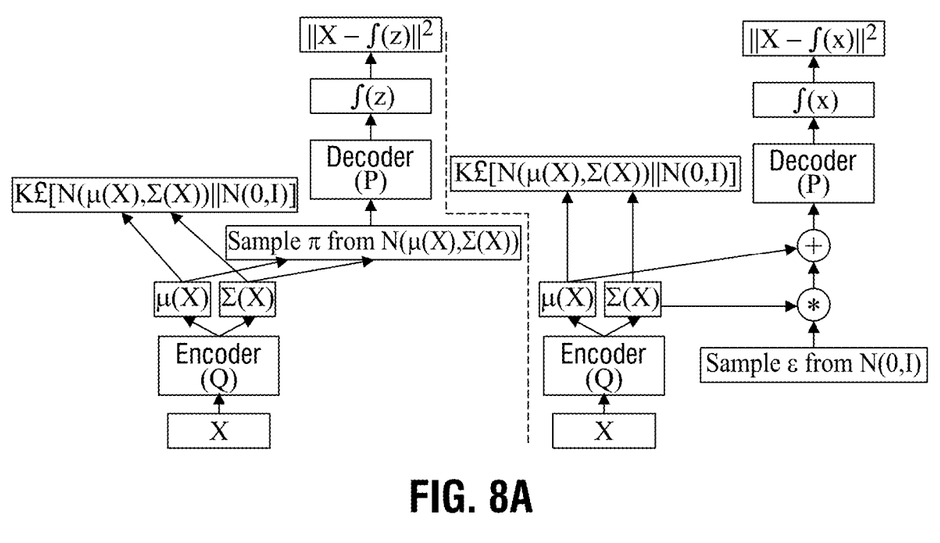
FIGS. 8A and 8B provide illustrations of conditional variable autoencoder as may be applicable to the teachings of the present disclosure
Figure 8B:
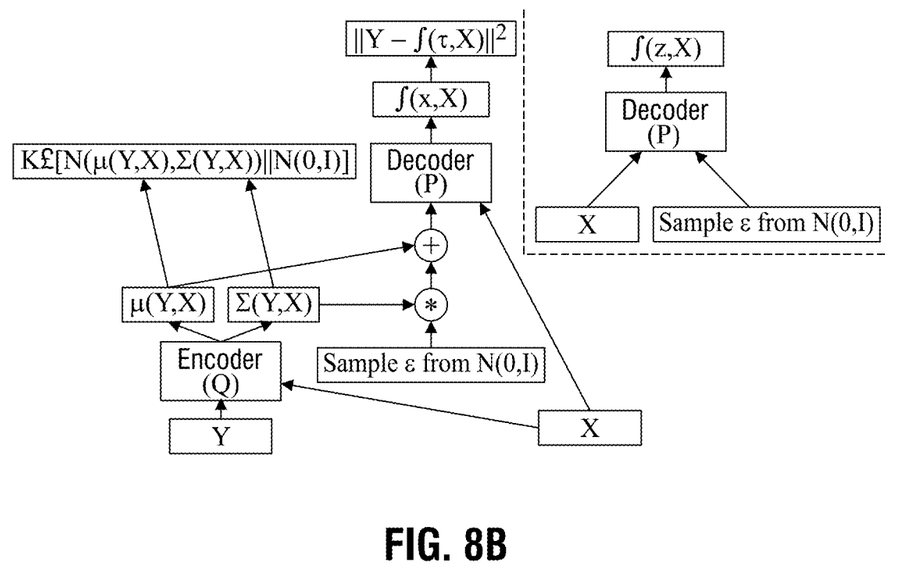
Figure 9A:
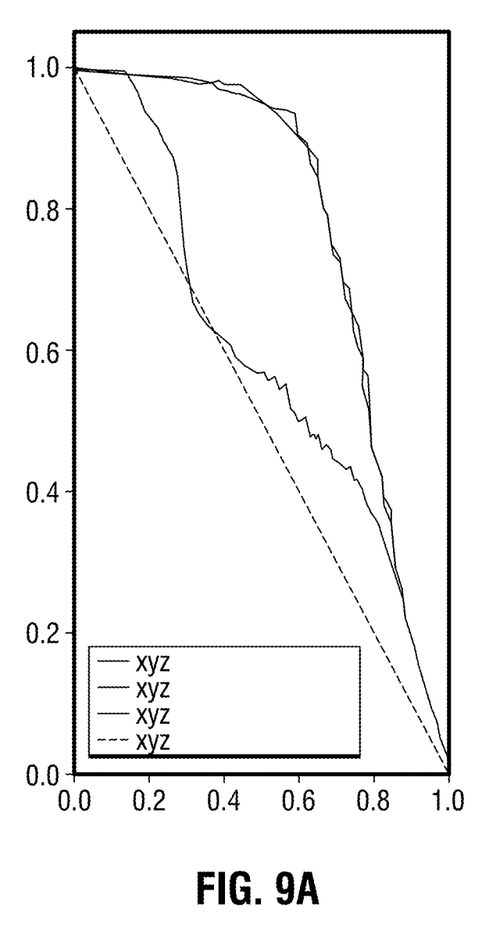
FIGS. 9A through 9D illustrate the relationship of the presently disclosed synthetic feature vectors with random noise.
Figure 9B:
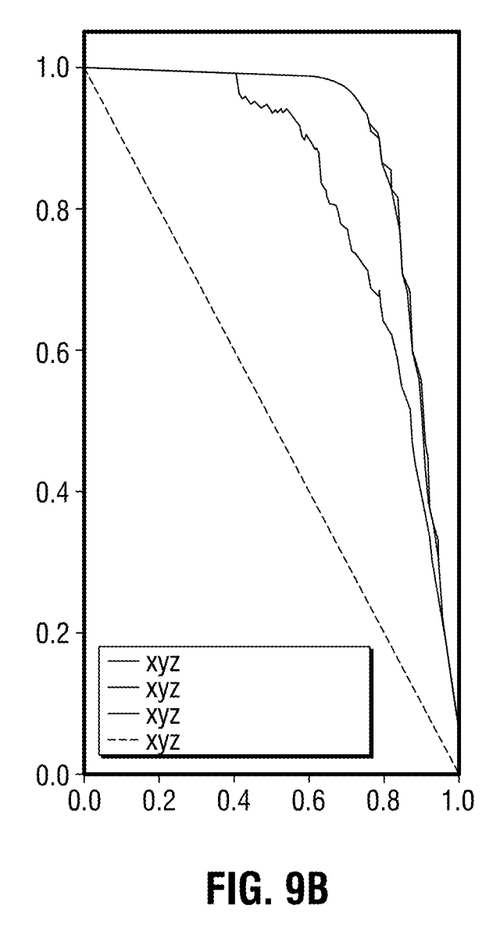
Figure 9C:
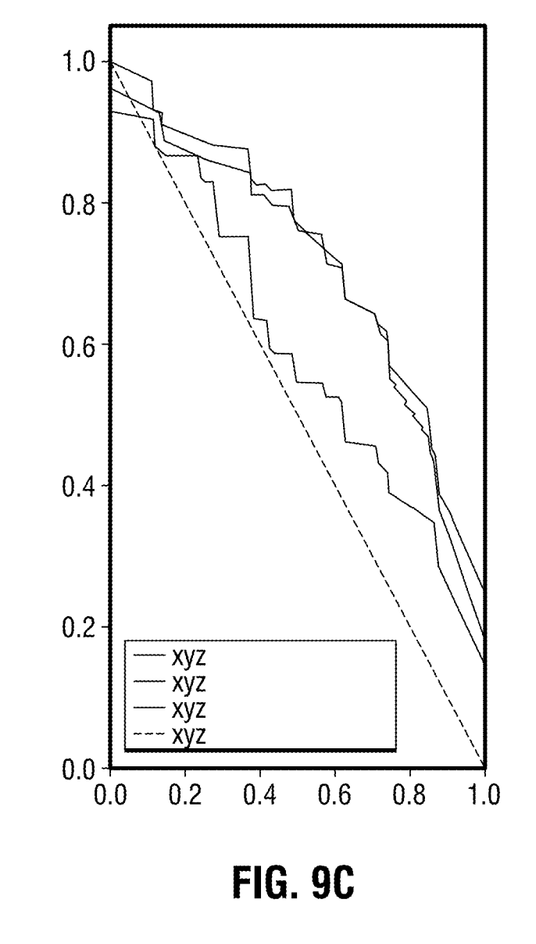
Figure 9D:
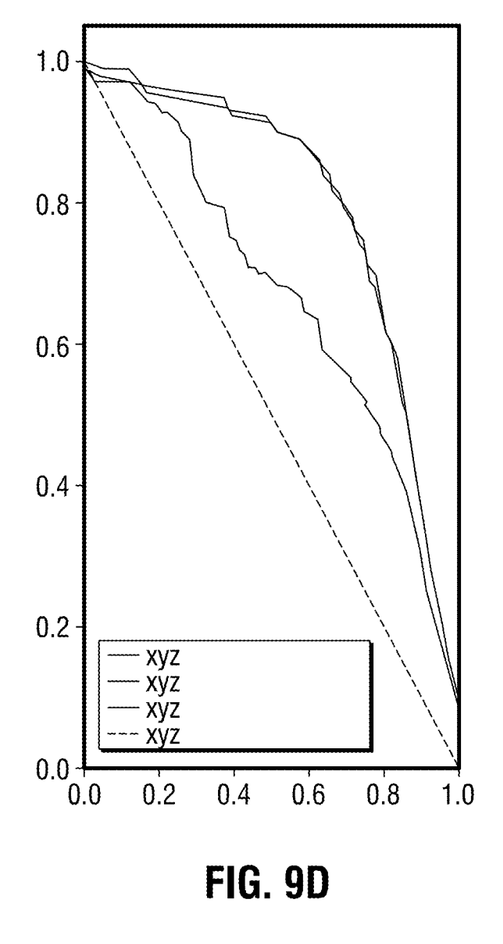

FIGS. 8A and 8B provide illustrations of a CVAE as may be applicable to the teachings of the present disclosure. Conditional Variational Autoencoder (CVAE) is a deep generative model, and the CVAE method is very promising to many fields, such as image generation, anomaly detection problems, and so on. Variational autoencoder (VAE) is a generative model which utilizes deep neural networks to describe the distribution of observed and latent (unobserved) variables. Using the VAE model, the data x is generated by $p\theta(x|z)$ where $\theta$ denotes the parameter of deep neural networks. Given the data x, there is the desire to maximize the log-likelihood log p(x) and in order to solve this problem, here the use of variational inference applies. The main principle of variational inference is to introduce an approximate distribution $q(z|x)$ and maximize the lower bound instead of the log-likelihood. In VAE, the approximate distribution $q(z|x)$ can be parameterized by $q\varphi(z|x)$ where $\varphi$ means the parameter of deep neural networks. We usually call $p(x|z)$ the encoder (or the recognition model) and $q(z|x)$ the decoder (or the generative model). From this point of view, it is possible to consider this model as a different kind of autoencoder and why it is called variational "autoencoder". By using the training algorithm Stochastic Gradient Variational Bayes (SGVB), it is possible to train deep neural networks on VAE by backpropagation.

VAE can reconstruct the data such as normal autoencoders. Moreover, VAE can generate samples from random values by using the decoder $p(x|z)$. Note that these generated samples are not actually exist in the original training data. VAE trains the probability distribution $p(x|z)$ which is most likely to generate the original data, therefore we can generate new samples which look like the original data. Conditional VAE is VAE architecture conditioning on another description of the data, y. In this model, it is possible to generate samples from the conditional distribution $p(x|y)$. By changing the value of y, such as numbers of labels in MNIST, it is possible to get corresponding samples $x \sim p(x|y)$.

FIGS. 9A through 9D illustrate the relationship of the presently disclosed synthetic feature vectors with random noise. Since it is known that adding noise can avoid overfitting, especially in a class-imbalance setting, the analysis takes 4000 samples from multivariate, standard Gaussian distribution. The data of FIGS. 9A through 9D depicts that importing random Gaussian noise also increases PR AUC by the same amount. This means that the gain from synthetic feature vectors may also be acting as noise to help the model generalize. Its efficacy in discovering new attacks in comparison with pure noise remains to be determined in online testing.

Technical advantages of the disclosed subject matter demonstrate that importing 4000 synthetic feature vectors improves PR AUC from 66 to 77% on production feature set. This approach is superior to using 100 global, real feature vectors, with PR AUC at 71% (with crosses in feature set). This improvement with synthetic feature vectors is not cumulative with improvement from adding DGA score, yet is comparable with data augmentation through noise.

A technique to produce an end-to-end system that may combine analyst intelligence with state-of-the-art machine learning techniques to detect new attacks and reduce the time elapsed between attack detection and successful prevention has been disclosed. Key advantages for the system are that it overcomes limited analyst bandwidth and the weaknesses of unsupervised learning, and it actively adapts and synthesizes new models. Additional advantages include a method and system for generating synthetic feature vectors from real, labelled feature vectors in artificial intelligence training of a big data machine to defend.

The benefits and advantages that may be provided by the present invention have been described above with regard to specific embodiments. These benefits and advantages, and any elements or limitations that may cause them to occur or to become more pronounced, are not to be construed as critical, required, or essential features of any or all of the claims. As used herein, the terms "comprises," "comprising," or any other variation thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The present disclosure exploits ideas from a wide range of fields, including outlier analysis, ensemble learning, active learning, information security, features analytics and big data computing.

What is claimed is:

1. A method for identifying and detecting threats to an enterprise or e-commerce system, the method comprising:
   grouping log lines belonging to one or more log line parameters from one or more enterprise or e-commerce system data sources or from incoming data traffic to the enterprise or e-commerce system;
   extracting one or more features from the grouped log lines into one or more features tables;
   using one or more statistical outlier detection methods on the one or more features tables to identify statistical outliers;
   labeling, in response to received instructions, the statistical outliers to create one or more labeled features tables;
   using the one or more labeled features tables to create an adaptive rules model for further identification of statistical outliers;
   when identified labeled statistical outliers comprise a sparsely labeled real data set, applying artificial intelligence processing to said identified labeled statistical outliers, comprising the steps of:
      receiving said sparsely labelled real data set for identifying malicious data and comprising real, labelled feature vectors;
      generating a synthetic data set comprising a plurality of synthetic feature vectors derived from said real, labelled feature vectors;
      identifying said sparsely labelled real data set as a local data set and said synthetic data set as a global set;
      applying a transfer learning framework for mixing said global data set with said local data set for increasing the precision recall area under curve (PR AUC) for reducing false positive indications occurring the in analysis of said threats to the enterprise; and
   preventing access by various threats to the enterprise or e-commerce system and detecting threats to the enterprise or e-commerce system in real-time based on a model formed using the generated synthetic data set.

2. The method of claim 1, further comprising the steps of labeling the output of a single top scores vector, and said adaptive rules model to create at least one labeled features matrix for providing new input to a supervised learning module for updating one or more identified threat labels.

3. The method of claim 1, further comprising the step of refining said adaptive rules model for identifying statistical outliers and preventing access to said enterprise system of categorized threats by detecting new threats in real time and reducing a time elapsed between threat detection of the enterprise system.

4. The method of claim 1, further comprising the step of generating negative labels for training and evaluation by designating unlabeled feature vectors as negative and randomly sampling unlabeled feature vectors within a predetermined date range corresponding to a date range of existing positive samples.

5. The method of claim 1, further comprising the step of generating and using synthetic feature vectors from real, labelled feature vectors for resolving data sparsity limitations when modeling anomalous events.

6. The method of claim 1, further comprising the step of using a transfer learning framework for simulating the effect of mixing synthetic and real feature vectors for forming a guideline in the absence of online A/B testing for evaluating experimental models for identifying malicious data on fresh, new datasets.

7. An apparatus for training a big data machine to defend an enterprise system, the apparatus comprising:
one or more processors;
system memory coupled to the one or more processors;
one or more non-transitory memory units coupled to the one or more processors; and
threat identification and detection code stored on the one or more non-transitory memory units that when executed by the one or more processors are configured to perform a method, the method comprising:
grouping log lines belonging to one or more log line parameters from one or more enterprise or e-commerce system data sources or from incoming data traffic to the enterprise or e-commerce system;
extracting one or more features from the grouped log lines into one or more features tables;
using the one or more labeled features tables to create an adaptive rules model for identification of statistical outliers; labeling, in response to received instructions, the statistical outliers to create one or more labeled features tables; using the one or more labeled features tables to create one or more rules for further modifying the adaptive rules model for identification of statistical outliers;
when identified labeled statistical outliers comprise a sparsely labeled real data set, applying artificial intelligence processing to said identified labeled statistical outliers, comprising the steps of:
receiving said sparsely labelled real data set for identifying malicious data and comprising real labelled feature vectors;
generating a synthetic data set comprising a plurality of synthetic feature vectors derived from said real, labelled feature vectors;
identifying said sparsely labelled real data set as a local data set and said synthetic data set as a global set;
applying a transfer learning framework for mixing said global data set with said local data set for increasing the precision recall area under curve (PR AUC) for reducing false positive indications occurring the in analysis of said threats to the enterprise; and
preventing access by various threats to the enterprise or e-commerce system and detecting threats to the enterprise or e-commerce system in real-time based on a model formed using the generated synthetic data set.

8. The apparatus of claim 7, further comprising the steps of labeling the output of a single top scores vector, and said adaptive rules model to create at least one labeled features matrix for providing new input to a supervised learning module for updating one or more identified threat labels.

9. The apparatus of claim 7, further comprising the step of refining said adaptive rules model for identifying statistical outliers and preventing access to said enterprise system of categorized threats by detecting new threats in real time and reducing a time elapsed between threat detection of the enterprise system.

10. The apparatus of claim 7, wherein said threat identification and detection code stored on the one or more non-transitory memory units perform a method that further comprises the step of generating negative labels for training and evaluation by designating unlabeled feature vectors as negative and randomly sampling unlabeled feature vectors within a predetermined date range corresponding to a date range of existing positive samples.

11. The apparatus of claim 7, further comprising the step of generating and using synthetic feature vectors from real, labelled feature vectors for resolving data sparsity limitations when modeling anomalous events.

12. The apparatus of claim 7, wherein said threat identification and detection code stored on the one or more non-transitory memory units perform a method that further comprises the step of using a transfer learning framework for simulating the effect of mixing synthetic and real feature vectors for forming a guideline in the absence of online A/B testing for evaluating experimental models for identifying malicious data on fresh, new datasets.

13. An enterprise system for providing networked computing services to a large enterprise, said enterprise system, comprising:
an apparatus for training a big data machine to defend an enterprise system, said apparatus comprising:
one or more processors;
system memory coupled to the one or more processors;
one or more non-transitory memory units coupled to the one or more processors; and
threat identification and detection code stored on the one or more non-transitory memory units that when executed by the one or more processors are configured to perform a method, the method comprising:
grouping log lines belonging to one or more log line parameters from one or more enterprise or e-commerce system data sources or from incoming data traffic to the enterprise or e-commerce system;
extracting one or more features from the grouped log lines into one or more features tables;
using the one or more labeled features tables to create an adaptive rules model for further identification of statistical outliers;
labeling, in response to received instructions, the statistical outliers to create one or more labeled features tables;
using the one or more labeled features tables to create one or more rules for further modifying the adaptive rules model for identification of statistical outliers;
when identified labeled statistical outliers comprise a sparsely labeled real data set, applying artificial intelligence processing to said identified labeled statistical outliers, comprising the steps of:
receiving said sparsely labelled real data set for identifying malicious data and comprising real labelled feature vectors;
generating a synthetic data set comprising a plurality of synthetic feature vectors derived from said real, labelled feature vectors;

identifying said sparsely labelled real data set as a local data set and said synthetic data set as a global set;

applying a transfer learning framework for mixing said global data set with said local data set for increasing the precision recall area under curve (PR AUC) for reducing false positive indications occurring the in analysis of said threats to the enterprise; and preventing access by various threats to the enterprise or e-commerce system and detecting threats to the enterprise or e-commerce system in real-time based on a model formed using the generated synthetic data set.

14. The enterprise system of claim 13, further comprising the steps of labeling the output of a single top scores vector, and said adaptive rules model to create at least one labeled features matrix for providing new input to a supervised learning module for updating one or more identified threat labels.

15. The enterprise system of claim 13, further comprising the step of refining said adaptive rules model for identifying statistical outliers and preventing access to said enterprise system of categorized threats by detecting new threats in real time and reducing a time elapsed between threat detection of the enterprise system.

16. The enterprise system of claim 13, wherein said apparatus for training a big data machine further comprises threat identification and detection code stored on the one or more non-transitory memory units for performing a method that further comprises the step of generating negative labels for training and evaluation by designating unlabeled feature vectors as negative and randomly sampling unlabeled feature vectors within a predetermined date range corresponding to a date range of existing positive samples.

17. The enterprise system of claim 13, further comprising the step of generating and using synthetic feature vectors from real, labelled feature vectors for resolving data sparsity limitations when modeling anomalous events.

18. The enterprise system of claim 13, wherein said apparatus for training a big data machine further comprises threat identification and detection code stored on the one or more non-transitory memory units for performing a method that further comprises the step of using a transfer learning framework for simulating the effect of mixing synthetic and real feature vectors for forming a guideline in the absence of online A/B testing for evaluating experimental models for identifying malicious data on fresh, new datasets.

* * * * *